3,444,192
PROCESS FOR PREPARING ALKOXY-
CHLORINATED BENZOIC ACIDS
Jack S. Newcomer, Wilson, N.Y., assignor to Hooker
Chemical Corporation, Niagara Falls, N.Y., a corporation of New York
No Drawing. Continuation-in-part of application Ser. No. 833,907, Aug. 17, 1959. This application Apr. 17, 1961, Ser. No. 103,260
Int. Cl. C07c 65/04, 51/00; A01n 9/24
U.S. Cl. 260—521                    1 Claim This application is a continuation-in-part of Ser. No. 833,907, filed Aug. 17, 1959, now abandoned.

This invention pertains to a novel series of aromatically derived herbicides useful for weed control.

More particularly, this invention described herein, relates to a novel class of organic herbicides, the alkoxypolychlorobenzoics, their salts and derivatives which when applied to a plant or to its immediate growing locus, exert a pronounced regulatory effect upon the plant's growth, yet leave little or no residue in the plant. The class of compounds referred to are within the generic formula below:

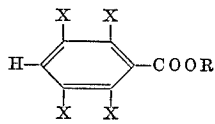

where X is a substituent selected from the group consisting of hydrogen, halogen and alkoxy, at least two of the substituents being halogen, and one of the substituents being alkoxy, and R is a member selected from the group consisting of alkali metals, ammonium, lower alkyl, substituted ammonium and hydrogen. While for economic reasons, the preferred halogen will ordinarily be chlorine, where convenience is paramount, bromine or another halogen may be used. While no limitation, other than practicality limits the alkoxy radical, generally the preferred group will range between one to eight carbons in length with or without branching or substitution. In general, the smaller the alkoxy group, the more herbicidal the compound, although some of the longer alkoxy groups impart special properties such as greater selectivity. Illustrative compounds, among others, are 2-methoxy-3,6-dichlorobenzoic acid, 2-methoxy-3,5-dichlorobenzoic acid, 2-methoxy - 3,5,6 - trichlorobenzoic acid, 2-ethoxy-3,5,6-trichlorobenzoic acid, 2-n-propoxy-3,5,6-trichlorobenzoic acid, 2-isopropoxy - 3,5,6 - trichlorobenzoic acid, 2-sec-butoxy-3,5,6 - trichlorobenzoic acid, 2-pri-amyloxy-3,5,6-trichlorobenzoic acid, 2 - ethoxyethoxy-3,5,6-trichlorobenzoic acid, 2 - ethoxy - 3,6-dichlorobenzoic acid, 2-ethoxyethoxy - 3,6 - dichlorobenzoic acid, 3-methoxy-2,6-dichlorobenzoic acid, 3-methoxy-2,5-dichlorobenzoic acid, 3 - methoxy - 2,5,6 - trichlorobenzoic acid and their sodium, potassium, ammonium salts and salts of mono-, di-, and tri-(lower) alkyl amines. The salts are formed by the conventional method of reacting the metal base, amine or ammonia with the solution of the alkoxy polychlorinated benzoic acid. The alkythio compounds, while active, are not as economically attractive as the oxygen analogues, while the esters and amides, though not equivalents, are useful herbicides.

While the number of herbicides commercially and experimentally available is huge and continually growing, there still exists a real need for a broad spectrum herbicide, that may be used as a pre-emergent and post-emergent herbicide on crops destined for animal and human consumption, without leaving toxic residues. The problem of toxic residues on crops has become pronounced for several reasons, one of which is the increased dependence on pesticides and herbicides. Another is the widespread use on facilities, animals and crops that are either used as food or food sources, per se or else are used in the processing of the food or food sources. DDT, which is probably the most widely used insecticide ever used, has been found to accumulate in the fatty tissue of certain body organs without being metabolised, for instance. Ideally, the desirable herbicide in addition to being active against both broad and narrow leaf weeds and being able to be used as a pre-emergent and post-emergent, should leave little or no residue on the crop that is being treated. While the low residue left by the alkoxypolychlorobenzoics of this invention is an important advantage, it is but one of several valuable characteristics possessed by these compositions. For example, the herbicidal compositions of this invention are highly selective and may be used to control weeds in established lawn and turf or weeds in cereal grains, such as fall seeded barley, wheat and oats. In addition, these herbicides may be effectively used to control annual weeds in cabbage, broccoli, cauliflower, or other cole crops.

Another illustration of the broad activity spectrum of these inventive compositions is that they are useful in the control of annual vegetation on land which is to remain fallow throughout the summer season. The inventive compositions may also be used to advantage for controlling broadleaf perennial herbaceous weeds, such as hoary cress, leafy spurge, horsenettle, Canada thistle, yellow toadflax, field bindwood, Russian knapweed and the like. Additional weed problems that these novel alkoxypolychlorinated herbicides are effective against are weeds and woody plants on pasture and rangeland. The following weeds in this connection can readily be controlled; Macartney rose, running oak, blackjack oak, post oak, turbenella oak, persimmon, junipers such as the alligator and Utah, the downy brome, cheat, chess and their related species.

That these compounds are herbicidal at all is most unexpected in view of my finding that the otherwise unsubstituted alkoxy-substituted benzoics are worthless as herbicides, and the literature reports that the alkoxybenzoics are only feebly active as plant growth regulators.

Another advantage of these herbicides is their compatibility with a variety of other herbicides, including the chlorinated alkyl aryl ureas, the 2,4-D's, the chlorates and others.

An additional advantage of these herbicidal compositions is their activity against both grasses and broadleaf weeds at low rates of application. Other advantages such as ease of formulation will suggest themselves to one skilled in the art.

A further major advantage over known herbicides such as polychlorobenzoic acid is the high activity of these compounds in foliar applications, whereas the polychlorobenzoic acids work almost exclusively by root uptake and are thus subject to deactivation or retardation of action due to adsorption by the soil.

The compounds of this invention may be used alone or in combination with other herbicides or pesticides. If dilution is desired, it may be achieved through combination with a host of solid and liquid diluents such as clay, diatomaceous earth, silica, mica, sawdust, starch, benzene, xylene, ethanol, methanol, water, petroleum fractions and the like. Emulsions of the herbicide may readily be prepared using among other things, polyoxyethylene ethers, sorbitol esters, sulfonated animal and vegetable oils. Foliar sprays may be made up by using the mono or dimethylamine salt, or the alkali metal, ammonium or substituted ammonium salts in water with the usual wetting agents and detergents commonly used in the art.

While the exact rate of application of these herbicidal compositions cannot be stated with precision due to variance in weed species, soil character, duration of control and climate, the range of application has been found to be from one-eighth of a pound to fity pounds per acre. Some typical illustrations of rates of application may be advanced which the applicants have found to be preferable under certain defined conditions.

For example, to control hard to kill broadleaf weeds such as red sorrel, knotweed, common chickweed, mouse-ear chickweed and henbit in established turf and lawn, a foliar spray consisting of one to four pounds per acre in fall and/or spring has been found to be effective.

An application of one-eighth of a pound to one pound per acre in the spring and one-half to two pounds per acre in the fall through foliar application is suggested to control weeds such as dog fennel in fall seeded barley, wheat and oats, while most annual weeds in cole crops such as cabbage, broccoli, cauliflower will succumb to four to eight pounds per acre either through foliar or broadcast application.

For the control of annual vegetation on summer fallow land the rate suggested is two to four pounds per acre when used alone or one-half to two pounds per acre when the present herbicides are used in combination with other soil sterilants.

The control of herbaceous broadleaf weeds may be obtained using ten to thirty pounds per acre as a foliar spray in a single application, or splitting this application rate during the growing season.

Range and pasture weeds such as the oak species, persimmon, cheat, downy brome and chess are best broadcast or basally sprayed using rates of application ranging from one-half to four pounds per acre.

The herbicidal compositions of this invention were unreported in the literature. Due to their comparatively simple structure, they probably may be made through a variety of synthetic routes. The availability of a large and inexpensive source of the polychlorinated benzoic acid made practical the applicants' choice of nucleophilic displacement of a halogen from the corresponding 2,3,6-tri, 2,3,5-tri, or 2,3,5,6-tetrachlorobenzoic acids through the addition of a strong base such as the alkoxide or hydroxide.

The nucleophilic displacement reaction is conveniently carried out in pressure vessels, fitted with facilities for vigorous agitation, and provision for cooling and heating. While the exact conditions are dependent upon the product sought, the reaction is run generally as follows:

The polychlorinated benzoic acid is added to a solution of at least two moles of a strong base such as sodium, potassium or lithium alkoxide or hydroxide and an excess of the alcohol corresponding to the alkoxy group to be introduced. Alternatively, the alkoxide may be made in situ by adding sodium, lithium or potassium to the proper alcohol, then adding the polychlorinated benzoic acid. Or the acid may first be converted to a salt as a separate step and the salt reacted with at least one mole of a strong base in the chosen alcohol. Temperatures of eighty to one hundred and fifty degrees centigrade have been found most suitable, lower temperatures giving too slow a reaction, and higher temperatures leading to decarboxylation of the acid and dehydrogenation of the alcohol. Catalysts such as copper or its salts have a slight accelerating effect but are not necessary and tend to intensify side reactions. Amine solvents such as pyridine are catalytic to the reaction.

The products obtained are a mixture of alkoxylated polychlorinated benzoic acids including the 2,3,5 and 6 mono and dialkoxy polychlorinated benzoic acids (when the tetrachlorobenzoic acids are used), with the 2-alkoxy greatly predominating. The procedure, after the course of the reaction has been followed by Volhard determination of the released chloride ion, is to analyze the reaction mixture using infra-red analysis and gas chromatography (modified from the general procedures set forth in Gas Chromatography by A. I. M. Keulemanf, 2nd Edition, 1957, Rheinhold Publishing Corporation), to determine the qualitative and quantitative content of the cuts to be worked up. The cuts rich in the desired product are reduced in volume and fractionally crystallized to the desired degree of purity.

For production of larger quantities of pure isomers, fractional crystallization is useful. The products may be used as mixtures of isomers or as the resolved compounds as set forth above.

Non-limiting illustrations of the preparations of this invention and their activity as herbicides follow.

Example 1

One hundred parts by weight of 2,3,6-trichlorobenzoic acid is added with stirring to a pressure flask containing an excess over the equivalent weight of sodium methoxide in an excess of methanol. The reaction is stopped by cooling the container after the chloride ion concentration has exceeded one molar equivalent, as measured by the Volhard chloride method. The methanol is removed by vacuum distillation until an oily residue is obtained. This residue when subjected to vapor phase chromatography establishes the presence of 2-methoxy-3,6-dichlorobenzoic acid. The reaction mixture is fractionally crystallized from water and methanol, yielding a crystalline product melting at one hundred and fourteen to one hundred and sixteen degrees centigrade. The identity of the 2-methoxy-3,6-dichlorobenzoic acid is established by decarboxylating to give the known 2,5-dichloroanisole.

Example 2

One hundred parts by weight of 2,3,5-trichlorobenzoic acid is added with stirring to a pressure flask containing an excess over the equivalent weight of sodium methoxide in an excess of methanol. The exothermic reaction is checked by cooling the flask after the Volhard chloride analysis of the reaction mixture shows slightly over a molar equivalent of chloride has been released. The methanol is removed under vacuum and the residue when subjected to vapor phase chromatography is found to contain the desired 2-methoxy-3,5-dichlorobenzoic acid product. Fractional crystallization from water and methanol yields a product melting at one hundred and sixty-four to one hundred and sixty-six degrees centigrade, which is in all ways identical to the product formed by diazomethane methylation on the known 3,5-dichlorosalicyclic acid.

Example 3

The procedure of Examples 1 and 2 is followed except the starting acid used is 2,3,5,6-tetrachlorobenzoic acid. Again vapor phase chromatography establishes the presence of a large proportion of the desired 2-methoxy-3,5,6-tetrachlorobenzoic acid and the crystallized preparation melts at one hundred and thirty-seven to one hundred and thirty-nine degrees centigrade. A comparison of this product with the product obtained by methylating the known 3,5,6-trichlorosalicyclic acid shows their identity and confirms the preparation.

Example 4

Using the same equipment, synthetic procedures and analytical techniques described in Examples 1 and 2, the following compounds are prepared, isolated and identified.

| Product made | Derived from— |
|---|---|
| 2-ethoxy-3,5,6-trichlorobenzoic acid | 2,3,5,6-tetrachlorobenzoic acid and sodium ethoxide. |
| 2-n-propoxy-3,5,6-trichlorobenzoic acid. | 2,3,5,6-tetrachlorobenzoic acid and sodium propoxide. |
| 2-isopropoxy-3,5,6-trichlorobenzoic acid. | 2,3,5,6-tetrachlorobenzoic acid and sodium isopropoxide. |
| 2-sec-butoxy-3,5,6-trichlorobenzoic acid. | 2,3,5,6-tetrachlorobenzoid acid and sodium sec-butoxide. |
| 2-pri-amyloxy-3,5,6-trichlorobenzoic acid. | 2,3,5,6-tretachlorobenzoic acid and sodium pri-amyloxlde. |
| 2-ethoxyethoxy-3,5,6-trichlorobenzoic acid. | 2,3,5,6-tetrachlorobenzoic acid and sodium ethoxyethoxide. |
| 2-ethoxy-3,6-dichlorobenzoic acid | 2,3,6-trichlorobenzoic acid and sodium ethoxide. |
| 2-ethoxyethoxy-3,6-dichlorobenzoic acid. | 2,3,6-trichlorobenzoic acid and sodium ethoxyethoxide. |

Example 5

To obtain a more quantitative measure of herbicidal activity than can be readily obtained through field testing, careful bioassays for plant growth activity are run on representative compounds of this invention as well as closely related compounds using the method of Mitchell et al., "Test Methods With Plant Regulating Chemicals," USDA Handbook 126 (1958), p. 58.

The activity in this assay is reported as "$IC_{50}$" (the concentration of chemical expressed in parts per million in water required to give fifty percent inhibition of elongation of the roots of cucumber). The lower the $IC_{50}$, the more herbicidal the chemical.

| Compound: | $IC_{50}$ (p.p.m.) |
|---|---|
| 2-methoxybenzoic acid (Standard for Comparison) | >100 |
| 2,5-dichlorobenzoic acid (Standard for Comparison) | >50 |
| 2,3,5,6-tetrachlorobenzoic acid (Standard for Comparison) | 35 |
| 2-methoxy-3,6-dichlorobenzoic acid | 0.5 |
| 2-methoxy-3,5-dichlorobenzoic acid | 3 |
| 2-methoxy-3,5,6-trichlorobenzoic acid | 5 |

Example 6

An area of farm land is plowed, disced and divided into test plots and seeded with corn. The area is naturally infested with broadleaf weeds, predominantly lamb's-quarters, ragweed, pigweed and volunteer red clover. Within one to two days after planting and prior to emergence, the plots are sprayed at eight pounds per acre with aqueous emulsions of the test chemicals, made up by blending one hundred parts by weight of the herbicide, two hundred parts by weight of xylene and fifty parts by weight of a nonionic polyether emulsifier (Atlox 3335P). Observations are made seventeen days later. Evaluation is made on damage to corn and weed control.

| Compound | Corn damage | Weed control |
|---|---|---|
| 2-ethoxy-3,5,6-trichlorobenzoic acid | None | 2 |
| 2-n-propoxy-3,5,6-trichlorobenzoic acid | do | 3 |
| 2-isopropoxy-3,5,6-trichlorobenzoic acid | do | 3 |
| 2-n-butoxy-3,5,6-trichlorobenzoic acid | do | 2-3 |
| 2-sec-butoxy-3,5,6-trichlorobenzoic acid | do | 2 |
| 2-pri-amyloxy-3,5,6-trichlorobenzoic acid | do | 3 |
| 2-ethoxyethoxy-3,5,6-trichlorobenzoic acid | do | 2-3 |
| 2-methoxy-3,6-dichlorobenzoic acid | Moderate | 3 |
| 2-ethoxy-3,6-dichlorobenzoic acid | None | 3 |
| 2-ethoxyethoxy-3,6-dichlorobenzoic acid | do | 3 |
| 2,3,6-trichlorobenzoic acid (standard for comparison) | Severe | 3 |
| 2,3,5-trichlorobenzoic acid (standard for comparison) | None | 1 |
| 2,3,5,6-tetrachlorobenzoic acid (standard for comparison) | do | 1 |

NOTES.—1. Corn damage interpreted visually on basis of stunting, leaf malformation, reduction of prop roots, twisting of stalk. 2. Scale for weed control: 0=no control, 1=slight control, 2=fair control, 3=good control.

The area containing these plots was observed the subsequent year. Substantial malformations were noted in all broadleaf plants growing in the plots in which the tri- and tetrachlorobenzoic acids had been sprayed the previous year, but no such malformations were noted in plots where the alkoxy acids had been sprayed, showing the latter series to be much less persistent in the soil.

Example 7

An additional representative formulation of the present herbicides may be made as follows:

Blend at twenty to twenty-five degrees centigrade the following materials in the proportions given.

| | Parts by weight |
|---|---|
| 2-methoxy-3,6-dichlorobenzoic acid | 100 |
| Dimethylamine | 21 |
| Water | 279 |

The above formulation or one in which another alkoxypolychlorinatedbenzoic acid is substituted for 2-methoxy-3,6-dichlorobenzoic acid may be applied by foliar application to control weeds.

I claim:
1. The process for preparing alkoxychlorinated benzoic acids of the following formula:

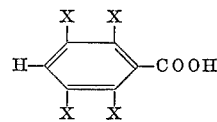

where X is a member selected from the group consisting of hydrogen, halogen and alkoxy, one substituent being alkoxy and at least two being halogen, comprising the step of heating a compound selected from the group consisting of 2,3,6-trichlorobenzoic acid, 2,3,5-trichlorobenzoic acid and 2,3,5,6-tetrachlorobenzoic acid, with an alcohol plus at least two moles of a base selected from the group consisting of sodium alkoxide, sodium hydroxide, potassium hydroxide, and mixtures thereof, until one molar equivalent of chloride ion is released.

References Cited

UNITED STATES PATENTS

| 2,394,916 | 2/1946 | Jones | 71—2.6 |
| 3,013,054 | 12/1961 | Richter | 71—2.6 XR |
| 3,013,055 | 12/1961 | Richter | 71—2.6 XR |
| 3,013,060 | 12/1961 | Richter | 71—2.6 XR |
| 3,013,062 | 12/1961 | Richter | 71—2.6 XR |
| 1,891,677 | 12/1932 | Laska et al. | 260—521 |
| 2,753,373 | 7/1956 | Hutchings et al. | 260—521 |
| 2,863,754 | 12/1958 | Wain | 71—2.6 |
| 2,898,206 | 8/1959 | Monoogian | 71—2.6 |

FOREIGN PATENTS 517,382   1/1940   Great Britain.

OTHER REFERENCES

Migrdichian "Organic Synthesis," vol. 1, copyright 1957, pp. 77–78, Div. 38.

Theilheimer, "Synthetic Methods of Organic Chemistry," vol II, copyright 1949, p. 83, Div. 38.

JAMES O. THOMAS, JR., Primary Examiner.

U.S. Cl. X.R.

71—84, 98, 107, 115, 118, 120